United States Patent
Kao et al.

(10) Patent No.: US 7,710,309 B2
(45) Date of Patent: May 4, 2010

(54) METHOD FOR SMALL-SCALE FISHING BOAT EQUIPPED WITH RADAR RECEIVER TO AVOID SHIP COLLISION AND THE RADAR RECEIVER THEREFOR

(75) Inventors: Sheng Long Kao, Keelung (TW); Ming An Lee, Keelung (TW)

(73) Assignee: National Taiwan Ocean University, Keelung (TW)

( * ) Notice: Subject to any disclaimer, the term of this patent is extended or adjusted under 35 U.S.C. 154(b) by 0 days.

(21) Appl. No.: 12/331,258

(22) Filed: Dec. 9, 2008

(65) Prior Publication Data
US 2009/0167592 A1 Jul. 2, 2009

(30) Foreign Application Priority Data
Dec. 28, 2007 (TW) .............................. 96150958 A

(51) Int. Cl.
*G01S 13/93* (2006.01)
(52) U.S. Cl. ........................................ 342/41; 701/301
(58) Field of Classification Search .................. 342/29, 342/41; 701/21, 301
See application file for complete search history.

(56) References Cited

U.S. PATENT DOCUMENTS 4,926,171 A * 5/1990 Kelley ........................ 701/301
7,089,094 B2 * 8/2006 Yanagi ......................... 701/21
7,417,583 B2 * 8/2008 Wood et al. .................... 342/41

* cited by examiner

*Primary Examiner*—Ian J Lobo
(74) *Attorney, Agent, or Firm*—Rabin & Berdo, PC

(57) ABSTRACT

A method for small-scale fishing boat to avoid ship collision includes the steps of: (1) equipping the small-scale fishing boat with a radar signal receiver for scanning and receiving radar signals transmitted by other ships within the receiving range of the radar signal receiver; (2) using a monitoring computer having a Marine Geographic Information System (Marine GIS) installed thereon to obtain at real time information about the distance, bearings, and etc. of other approaching ships in order to monitor the dynamic conditions of the approaching ships within the fishing boat's operating water area; and (3) actuating a collision warning mechanism based on the intensities of received radar signals when there is more than one approaching ship, so that the small-scale fishing boat can timely receive a collision warning to reduce the risk of collision and maintain safe and smooth voyage on the sea.

5 Claims, 2 Drawing Sheets

METHOD FOR SMALL-SCALE FISHING BOAT EQUIPPED WITH RADAR RECEIVER TO AVOID SHIP COLLISION AND THE RADAR RECEIVER THEREFOR

FIELD OF THE INVENTION

The present invention relates to a method and radar signal receiver for small-scale fishing boat to avoid ship collision, and more particularly to a method of avoiding ship collision by installing a radar signal receiver and a Marine Geographic Information System (Marine GIS) on a small-scale fishing boat, receiving radar signals from other ships within the receiving range of the radar signal receiver, timely monitoring approaching ships to acquire dynamic information about the approaching ships, calculating possible collision, and timely generating collision warning to thereby reduce the probability of collision with other ships.

BACKGROUND OF THE INVENTION

In many countries, there are a lot of small-scale fishing boats conducting fishing operation in offshore water. Unlike the deep sea fishing vessels and other large-scale ships, the small-scale fishing boats have a small tonnage and are not required by relevant regulations to equip itself with a radar apparatus or other similar detection apparatus. Such small-scale fishing boats operating in offshore water lack sufficient alertness and frequently unawares anchor or steer in a course of a large-scale ship. On the other hand, the large-scale ships have fast speed and high tonnage, and frequently fail to timely take proper actions such as changing the course in response to the small-scale fishing boat or other emergent event unexpected presented in the course. Therefore, serious collision will occur and the small-scale fishing boat would usually become the victim in the collision.

Since an Automatic Identification System (AIS) is highly expensive and not affordable by general fishermen, it is difficult to demand all the small-scale fishing boats to be equipped with the AIS to ensure safe fishing operation, particularly in offshore water.

Therefore, it is desirable to provide a method and radar signal receiver for a small-scale fishing boat to collect information of approaching ships and timely generate a warning signal to avoid collision with other ships.

SUMMARY OF THE INVENTION

A primary object of the present invention is to provide a radar signal receiver for installing on a small-scale fishing boat, so that the small-scale fishing boat can utilize the radar signal receiver to scan and receive radar signals from other ships within the receiving range of the radar signal receiver, monitor the dynamic states of approaching ships within the operating water area of the small-scale fishing boat, and determine correct heading direction to thereby reduce collision of the fishing boat with other ships.

Another object of the present invention is to provide a method for a small-scale fishing boat equipped with a radar receiver to avoid collision. With the method of the present invention, the radar signal receiver on the small-scale fishing boat receives radar signals transmitted from other ships within the receiving range of the radar signal receiver, and a Marine Geographic Information System (Marine GIS) calculates the intensities (dB) of the received radar signals to derive parameters of voyage information of approaching ships, so that the small-scale fishing boat can automatically obtain the approaching ships' dynamic information at real time to actuate a collision warning mechanism based on the intensities of the received radar signals. In this manner, the small-scale fishing boat can timely receive the collision warning and it is possible to ensure safe and smooth voyage of the small-scale fishing boats and other ships on the sea.

To achieve the above and other objects, the radar receiver according to the present invention for installing on the small-scale fishing boat to avoid ship collision includes at least a radar signal receiver for detecting radar signals within a receiving range thereof; a monitoring computer being electrically connected to the radar signal receiver for processing calculations in connection with the detection, the tracking, and the occurrence of a possible collision; a display screen for displaying related information; and an alarm being electrically connected to the monitoring computer for generating a collision warning.

In a preferred embodiment of the present invention, the monitoring computer has a Marine Geographic Information System (Marine GIS) installed thereon.

In an ideal embodiment of the present invention, the alarm is a buzzer.

In an operable embodiment of the present invention, the alarm is a warning light.

The method for a small-scale fishing boat equipped with radar receiver to avoid ship collision according to the present invention includes the following steps:

(a) turning on a radar signal receiver of the radar receiver to detect targets within a receiving range of the radar signal receiver;

(b) selecting one particular target from the detected targets and track the selected target;

(c) calculating voyage data of the selected target;

(d) determining whether there is a risk of colliding with the selected target; if yes, generating a collision warning;

(e) calculating to derive the distance and time from the occurrence of collision; and, in the event the derived time to the occurrence of collision being very short, generate a collision warning; and (f) making a judgment based on the sea route regulations, and showing results of the judgment on a display screen of the radar receiver.

Wherein, the step (b) further includes the step of sending location information of the target shown on the display screen to the monitoring computer in order for the monitoring computer to record the target location information.

In the Step (c) of calculating voyage data of the target, each individual target is watched for the continuous changes in the location of the target, and a motion locus of the target and other information about the target such as the bearings, the range, the Closest Point of Approach (CPA), the Time to the Closest Point of Approach (TCPA), the True Bearings (TB), the True Course (TC), the Target Speed (TS), and etc. of the target is established.

The Step (d) further includes the step of causing the monitoring computer to determine whether the target forms a risk of collision; if yes, the monitoring computer immediately calculate to derive a Point of Possible Collision (PPC).

In the present invention, the radar signal receiver equipped on the small-scale fishing boat is used to scan and receive radar signals transmitted from other ships within the receiving range of the radar signal receiver, and the Marine GIS is also installed on the monitoring computer for timely obtain the voyage distance and bearings of other ships approaching the small-scale fishing boat, so as to monitor the dynamic conditions of all ships within the operating water area of the small-scale fishing boat. The intensities (dB) of signals received by the radar signal receiver on the small-scale fishing boat from other ships within the receiving range of the radar signal receiver are computed by the Marine GIS to derive parameters of navigation information of the approaching ships, such as the approaching direction, the approaching speed, the approaching distance, and etc., so that the small-scale fishing boat is able to automatically detect at real time for the dynamic conditions of approaching ships in order to know the approaching direction and distance of the approaching ships, and actuates the collision warning mechanism according to the intensities of radar signals received from other ships when there are more than one approaching ships. Therefore, the small-scale fishing boat can timely receive a collision warning in order to reduce the risk of collision and maintain safe and smooth voyage on the sea.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
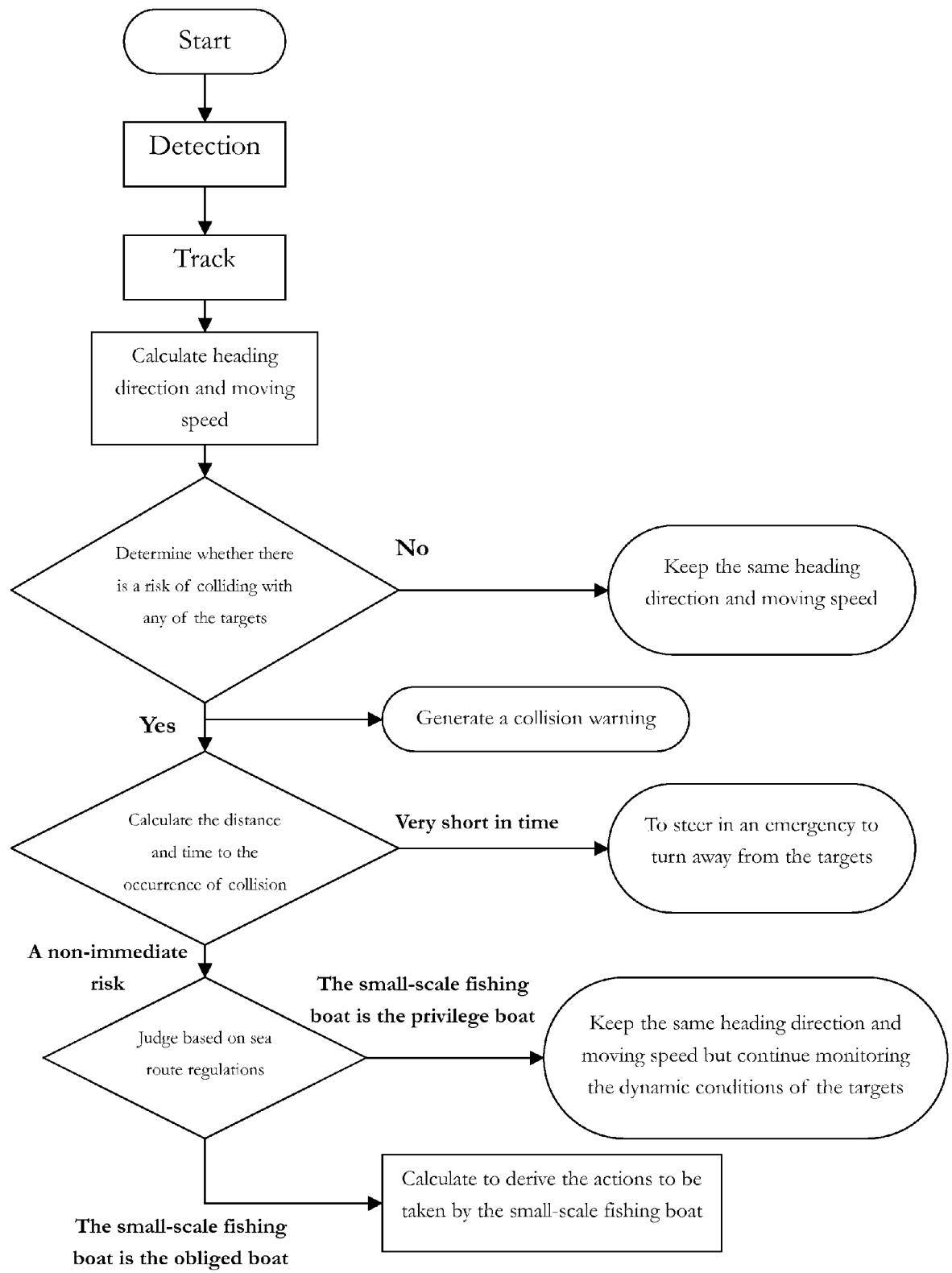
FIG. 1 is a flowchart showing the steps included in the method for small-scale fishing boat to avoid ship collision according to the present invention.

Please refer to FIG. 1, which is a flowchart showing the steps included in a method for small-scale fishing boat to avoid ship collision according to the present invention. First, the small-scale fishing boat is equipped with a radar signal receiver for receiving radar signals transmitted by other ships within the receiving range of the radar signal receiver, so as to monitor dynamic information about all other ships within the target water area at real time, conduct calculations to avoid any possible collision, and generate a collision warning in the event of any risk of collision. Therefore, the radar signal receiver guides the small-scale fishing boat to navigate safely and smoothly on the sea, and protects the small-scale fishing boat from collision with other nearby ships.

For the method of the present invention to be effectively applied to the small-scale fishing boat for receiving and judging information about other ships and timely generating collision warning, the small-scale fishing boat must first be equipped with a radar receiver. The radar receiver includes at least a radar signal receiver for detecting radar signals within a receiving range thereof; a monitoring computer being electrically connected to the radar signal receiver for processing calculations in connection with the detection, the tracking, and the occurrence of a possible collision; a display screen for displaying related information; and an alarm being electrically connected to the monitoring computer for generating a collision warning.

In a preferred embodiment of the present invention, the monitoring computer has a Marine Geographic Information System (Marine GIS) installed thereon.

In an ideal embodiment of the present invention, the alarm is a buzzer.

In an operable embodiment of the present invention, the alarm is a warning light.

Having been equipped with the above-mentioned radar receiver, the small-scale fishing boat in operation can follow predetermined procedures to execute the method of avoiding ship collision according to the present invention. The method of the present invention includes the following steps:

Step (a): Turning on the radar signal receiver to detect targets within the receiving range of the radar signal receiver.

To carry on the detection in the Step (a), the radar signal receiver is turned on to detect all targets within the receiving range of the radar signal receiver, so that data about the current locations and other details of the targets are loaded onto the Marine Geographic Information System (Marine GIS) installed on the monitoring computer and are identified on the display screen. The received detailed data, particularly the intensities (dB) of the radar signals transmitted by other ships within the receiving range of the radar signal receiver, are calculated by the Marine GIS to derive parameters of navigation information of approaching ships, such as the approaching direction, the approaching speed, the approaching distance, and etc. The information displayed on the display screen includes at least the heading directions and speeds of the targets being tracked, and is displayed in vector graphics to clearly indicate the projected target movement. The display screen should be able to quickly display the bearings of and the distance to any target. When changing the distance scale or resetting the display screen, the change or the reset should not be made beyond the exploratory sweeping time preset for the radar signal receiver, and there should be complete data displayed before the next exploratory sweeping is completed.

Step (b): Selecting a particular target and track the selected target.

In the Step (b), particular target is selected from all targets within the receiving range of the radar signal receiver, and a tracking procedure and a start tracking instruction are carried on against the selected target. In selecting the particular target, selection conditions, such as distance to the ship, ship tonnage, ship type, moving speed, and etc. can be set using a predetermined program.

The action taken in the Step (b) is generally referred to as "acquisition". That is, to select a target and to conduct the tracking procedure and execute the start tracking instruction against the selected target. The Step (b) further includes the step of sending the location of the target shown on the display screen to the monitoring computer in order for the monitoring computer to record the target's location information.

Step (c): Calculating voyage data of the target. That is, to watch the continuous changes in the location of the target, and establish motion locus of the target and other information about the target, including the bearings, the range, the Closest Point of Approach (CPA), the Time to the Closest Point of Approach (TCPA), the True Bearings (TB), the True Course (TC), the Target Speed (TS), and etc. of the target ship.

Step (d): Determining whether there is a risk of colliding with the target ship, and if yes, generating a collision warning.

The monitoring computer determines whether there is a risk of colliding with the target ship, and actuates a collision warning mechanism based on the information about the intensities of radar signal received by the radar signal receiver from the target ship within the receiving range of the radar signal receiver in order to avoid possible collision. In a preferred embodiment of the present invention, the monitoring computer will determine based on the intensity of a radar signal received from a target ship whether the distance to and the heading direction of the target ship form a threat of collision. If it is determined the target ship forms a threat of collision, the monitoring computer will immediately calculate to derive the Point of Possible Collision (PPC), and generates the collision warning and executes the following Step (e). On the other hand, if there is no risk of collision, the monitoring computer will keep tracking the target ship and maintains the small-scale fishing boat in the original heading direction and moving speed.

Step (e): Calculating the distance and time to the occurrence of collision, and generating a collision warning in the event the time to the occurrence of collision is very short.

In the Step (e), after having calculated to derive the Point of Possible Collision (PPC), the monitoring computer further calculates the distance and the time to the occurrence of collision. If the distance or the time to the collision is very short, a collision warning is generated for a pilot of the fishing boat to control the steering wheel in an emergency to turn away from the threatening target ship. The warning is generated using the alarm, which can be a buzzer or a warning light to urge the pilot to take emergent actions.

In the event of a non-immediate risk of collision, the monitoring computer will keep tracking the threatening target and make a judgment based on sea route regulations.

Figure 2:
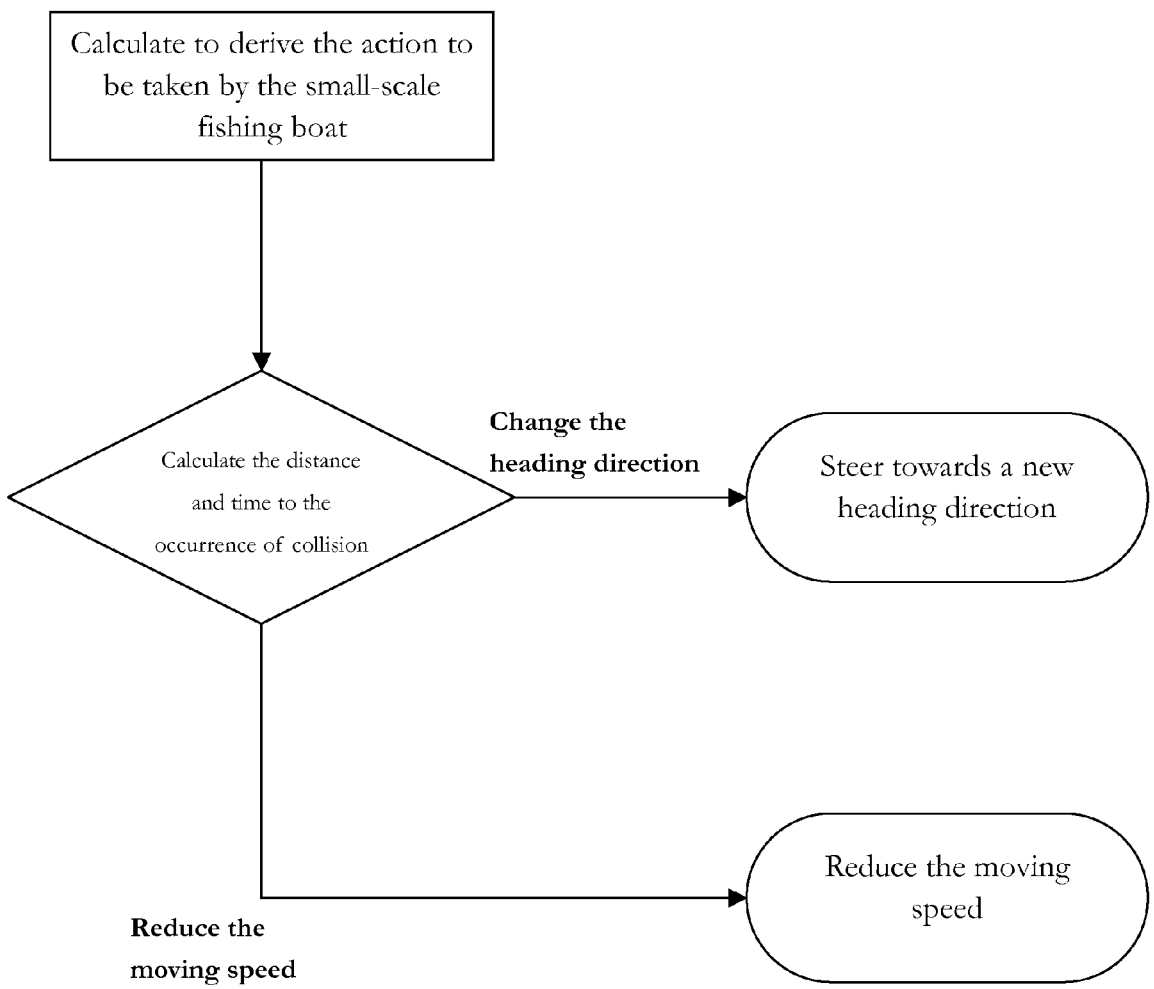
FIG. 2 is a flowchart showing the actions a small-scale fishing boat can take to avoid a possible ship collision according to the method of the present invention.

Step (f): Making a judgment based on sea route regulations, and showing the result on the display screen for the pilot to take proper measures according to actual conditions. In the event the result of judgment shows that the small-scale fishing boat itself is the privileged vessel, the pilot can keep the same heading direction and speed but needs to continue watching the target ship for its movement. On the other hand, if the result of judgment shows that the small-scale fishing boat itself is the obliged vessel, the monitoring computer should calculate the actions to be taken, such as changing the heading direction or reducing the moving speed. FIG. 2 is a flowchart showing the actions that can be taken by a small-scale fishing boat when the same is an obliged vessel according to the sea route regulations.

In brief, in the method of the present invention for a small-scale fishing boat to avoid ship collision, the small-scale fishing boat is equipped with a radar signal receiver; the radar signal receiver is used to receive radar signals from ships within the receiving range of the radar signal receiver, so that the small-scale fishing boat operating in offshore water is able to automatically detect at real time the voyage information of other ships and obtaining the voyage parameters thereof, and calculate based on the obtained information to derive the actions to be taken for avoiding collision. And, in the event of any risk of collision, the small-scale fishing boat can timely generate a collision warning, such as a buzzing sound or a warning light via an alarm for the pilot to take emergent actions, such as changing the heading direction or reducing the moving speed in order to lower the probability of ship collision and ensure the safety of the fishing boat. The method of avoiding collision according to the present invention also enables the small-scale fishing boat to obtain required information from time to time, so that the small-scale fishing boat can navigate safely and smoothly on the sea.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A method for a small-scale fishing boat equipped with radar receiver to avoid ship collision, the radar receiver including a radar signal receiver, a monitoring computer, a display screen, and an alarm; the method comprising the following steps:
    (a) turning on the radar signal receiver to detect targets within a receiving range of the radar signal receiver;
    (b) tracking selected targets among the detected targets within the receiving range using the monitoring computer, and concurrently displaying the locations of the selected targets on the display screen;
    (c) calculating voyage data of the selected targets using the monitoring computer;
    (d) determining whether there is a risk of colliding with any of the selected targets, and generating a first collision warning via the alarm if there is a risk of colliding;
    (e) calculating to derive a distance and time to an occurrence of collision using the monitoring computer, and generating a second collision warning via the alarm if the derived time to the occurrence of collision being very short, and
    (f) calculating sea voyage route avoiding the occurrence of the collision, and displaying the sea voyage route avoiding the collision on the display screen.

2. The method for a small-scale fishing boat to avoid ship collision as claimed in claim 1, wherein the step (d) further includes the step of causing the monitoring computer to determine whether any of the selected targets form a risk of collision; if yes, the monitoring computer immediately calculating to derive a Point of Possible Collision (PPC).

3. The method for a small-scale fishing boat to avoid ship collision as claimed in claim 1, wherein the monitoring computer includes a Marine Geographic Information System to integrate voyage data of each of the selected targets.

4. The method for a small-scale fishing boat to avoid ship collision as claimed in claim 1, wherein the voyage data includes relative position, range, velocity, relative velocity, true position, size, and escape time.

5. The method for a small-scale fishing boat to avoid ship collision as claimed in claim 1, wherein the radar signal receiver performs an omnidirectional radar sweep for the detected targets within the receiving range.

* * * * *